Oct. 2, 1962 J. R. FLEISCHER 3,056,150
BUFFING MACHINE FOR USE IN SHOE MAKING
Filed Feb. 15, 1962 2 Sheets-Sheet 1

Inventor
Julius R. Fleischer
by Roberts, Cushman & Grover
Att'ys

Oct. 2, 1962    J. R. FLEISCHER    3,056,150
BUFFING MACHINE FOR USE IN SHOE MAKING
Filed Feb. 15, 1962    2 Sheets-Sheet 2

United States Patent Office 3,056,150
Patented Oct. 2, 1962

3,056,150
BUFFING MACHINE FOR USE IN SHOE MAKING
Julius R. Fleischer, Malden, Mass., assignor to Converse Rubber Corporation, Malden, Mass., a corporation of Massachusetts
Filed Feb. 15, 1962, Ser. No. 173,493
13 Claims. (Cl. 12—17)

This invention relates to the manufacture of footwear and more especially to apparatus for buffing one surface of a preformed bottom element preparatory to attaching it to an upper.

In the manufacture of footwear of the kind in which the outer sole or one or more of the components making up the bottom structure of shoes are preformed by cutting, molding, or casting to size or oversize and adhesively attached to the upper, it is desirable to buff the surface which is to receive the adhesive or to be applied to an adhesive-coated surface to insure good bonding. Heretofore such buffing has been accomplished by holding each element, in turn, against a buffing wheel, an operation which is time consuming, tedious and dirty.

The principal objects of this invention are to provide apparatus for automatically buffing the surfaces of bottom elements in rapid succession; to provide apparatus which is capable of buffing bottom elements of different degrees of stiffness and composition and, in particular, plastic bottom elements which are soft, flabby and difficult to handle; and to provide apparatus for buffing the extremities of such elements equally as well as the surfaces intermediate the extremities.

As herein illustrated, the apparatus comprises first and second buffing wheels rotating in the same direction and first and second conveyors arranged to move elements disposed thereon toward the wheels into engagement with the downgoing sides thereof, to buff the upper surfaces, of means for guiding an element downwardly relative to the downgoing side of the first buffing wheel with the upper surface in contact therewith, guiding means for receiving an element buffed side down and guiding it to a place of inversion, of an inverter at said place of inversion for turning the element buffed side up, transfer means for receiving the element buffed side up from the inverting means and moving it into alignment with the second conveyor, and means for receiving the element buffed side up with the opposite end leading and guiding it onto the second conveyor. There are driven feed rolls adjacent the buffing wheels for advancing an element delivered thereto by the conveyor downwardly against the surface of the buffing wheel and guiding means, including rollers, for guiding the element onto the first transfer means. The inverter comprises an inclined plate situated adjacent an end of the first transfer means above the second transfer means, and means adjacent the plate for injecting a blast of air beneath an element projected from the first transfer means alongside of the plate above the second transfer means. The third transfer means is situated at a lower level than the second transfer means and there are converging plates extending from the second transfer means downwardly to the third transfer means for guiding elements from the second transfer means to the third transfer means, and means associated with the more remote of the plates for directing a blast of air against the upper side of an element sliding down the plate next to the second transfer means.

The invention will now be described in greater detail with reference to the accompanying drawings wherein.

Figure 3:
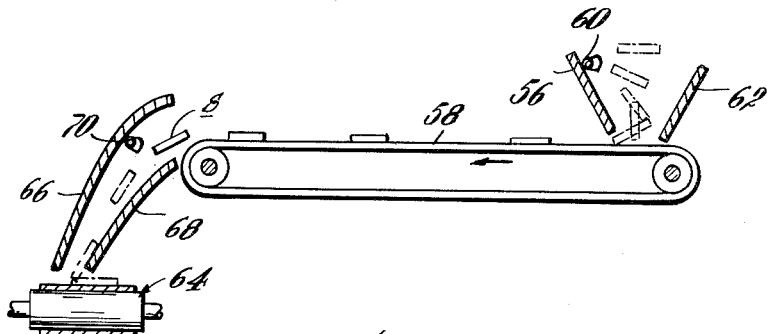
FIG. 3 is a vertical transverse section taken on the line 3—3 of FIG. 1.

The apparatus is shown herein somewhat diagrammatically, the supporting structure for the various component parts being omitted since any suitable kind of framework may be provided for this purpose. As shown (FIG. 2), there are two buffing wheels 10 and 12 in the form of cylindrical wire brushes fixed to shafts 14 and 16 for rotation in a counterclockwise direction, as indicated by the arrows in FIG. 2, and as seen from the front side of FIG. 1. The shafts 14 and 16 and hence the buffing wheels are situated in spaced parallel relation in box-like enclosures 18 and 20, each of which is connected by a suitable duct $d$ to an exhaust system for removing the dust created by the buffing operation as fast as it is produced. Conveyors 22 and 24 are supported adjacent the downgoing side of each of the wheels 10 and 12, the conveyors being of an endless belt type and having inclined portions 26 and 28, the lower ends of which are below the buffing wheels and horizontal portions 30 and 32 at a level slightly above the axes of the shafts 14 and 16, so that the articles to be buffed, that is, the bottom elements $s$ move upwardly along the inclined portions onto the horizontal portions and then are advanced directly toward the peripheral surfaces of the buffing wheels. Each of the enclosures 18 and 20 has a transversely extending opening 34 and 36 respectively, through which the element is advanced. Within the enclosures there are pairs of feed rolls 38, 40 which grip the leading end of an element and force it into engagement with the rapidly rotating peripheral surface of the buffing wheel, the latter operating to bend the leading end downwardly so that the combined action of the feed rolls and the wheel moves the element downwardly between a pair of driven guide rolls 42, 44 in the respective enclosures and, at the same time, buffs the upper surface of the element. Bottom openings 46, 48 are provided in the enclosures through which the element gravitates as its trailing end is released by the rolls 42, 44. The feed rolls 42 release an element buffed by the wheel 10 onto a downwardly and rearwardly inclined plate 50 which, in turn, guides the element downwardly between a pair of driven rollers 52 onto the upper surface of a transfer device 54, with the buffed side down. The element is advanced by the transfer device 54 to an inverter (FIG. 3) comprising an inclined plate 56 situated adjacent the end of the transfer device 54 above the upper surface of a transfer device 58. The transfer device 54 travels at a sufficient rate so that an element moving along its upper surface is projected forwardly through the air above the transfer device 58 alongside the plate 56, the latter being inclined downwardly and in a direction opposite to the direction of movement of the transfer device 58. Contact of the edge of the element next to the plate 56 with the plate supports it so that the opposite edge tips downwardly as it falls onto the upper surface of the transfer device 58 thereby turning the element over so that the buffed surface is now uppermost. To assist in such turning a nozzle 60 is mounted on the plate 56 near its upper edge in a position to eject a blast of air beneath the element as it is projected from the transfer device 54 thereby tending to start the element to tip if the plate has not already initiated such tipping. A second inclined plate 62 is arranged opposite the plate 56 and inclined downwardly toward the plate 56 both to prevent an element from falling off the end of the transfer device 58 and if an element is blown into engagement with the inclined surface to guide it downwardly into contact with the upper surface of the transfer device 58.

It is to be observed that if the elements are placed on the conveyors 22 with the toe end leading, their inversion as they pass by the first buffing wheel 12 results in disposition on the transfer device 58 with the toe ends facing in the opposite direction.

Figure 1:
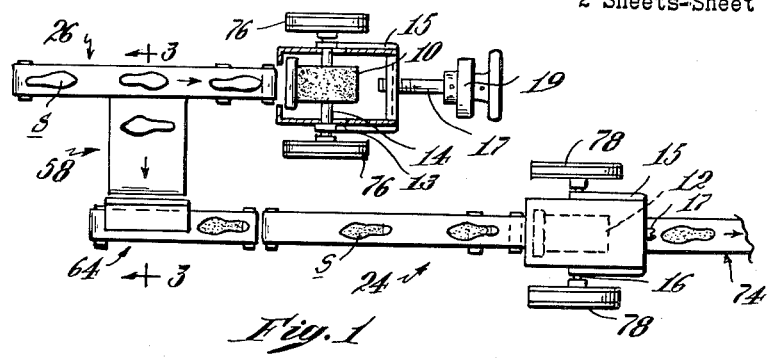
FIG. 1 is a plan view of the apparatus with portions shown in section.
Figure 2:
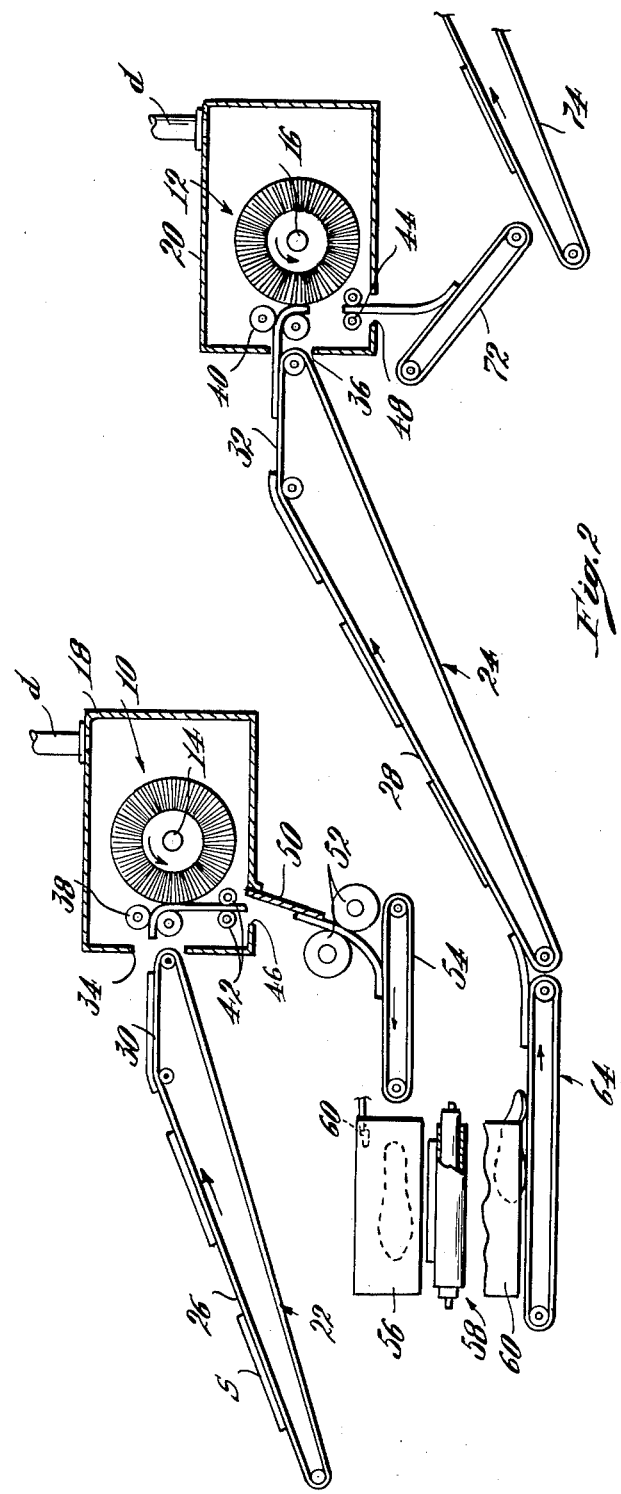
FIG. 2 is an elevation of the apparatus to much larger scale, showing parts in section.

The transfer device 58 moves the elements crosswise of the apparatus into alignment with the conveyor 24. The lower end of the conveyor 24 is situated below the level of the transfer device 58 and there is a transfer device 64 situated adjacent the end of the transfer device 58 but at a level corresponding to the lower end of the conveyor 24 for moving elements discharged from the transfer device 58 onto the conveyor 24. A pair of spaced, downwardly inclined plates 66 and 68, situated between the transfer device 58 and the transfer device 64, guide the elements from one to the other. The plate 66 has adjacent the upper portion thereof a nozzle 70 (FIG. 3) which ejects a blast of air against the upper surface of an element as it slides down the plate 68 thereby preventing it from tipping over so that when it falls onto the transfer device 64 it takes up a position in which the upper buffed surface is uppermost hence when the transfer device 64 moves it onto the conveyor 24, the element moves upwardly to the second buffing wheel with the buffed surface uppermost but with the opposite end, that is the heel end, as shown in FIG. 1, moving toward the buffing wheel 12. When the element reaches the horizontal run 32 and is advanced through the opening 36 in the enclosure 20, the feed rolls 40 grip the leading end and push it downwardly against the rapidly rotating peripheral surface of the wheel 12, thus again buffing the same surface of the element as before. The driven rolls 44 deliver the element downwardly onto a downwardly and forwardly inclined transfer device 72 which, in turn, delivers it to an upwardly inclined transfer device 74, the latter carrying it to some suitable point of distribution, either for the purpose of storage or for immediate use.

Buffing, in both instances, is effected by rotating the buffing wheel at a rate such that the linear speed of its surface is faster than the linear speed at which an element is delivered to and is moved passed the buffing wheel by the feed rolls 38, 42 in the first instance, and the feed rolls 40, 44 in the second instance.

One of the important aspects of the construction and arrangement of the components of this apparatus resides in reversing the direction of movement and inverting the elements between reversal so that the same surface is subjected to buffing twice, first with one end leading and then with the other end leading. The reason for reversing the direction of movement resides in the fact that the trailing end, when released by the feed rolls adjacent the wheel, is whipped away from the surface of the wheel due to the tendency of the wheel to accelerate the released end and hence to buckle the element and to the blast of air created by the wheel which tends to blow it away from the wheel so that the end is not buffed appreciably. By presentin geach end in turn as the leading end, buffing at each end is insured.

Each enclosure has elongate bearing apertures 13 (FIG. 1) through which the ends of the shaft supporting the buffing wheel therein project and along which they are adjustable relative to the feed rolls. Adjustment is effected by a yoke 15 through the extremities of which the shaft passes and an adjusting screw 17, the latter being supported in a fixed collar 19 mounted on the frame of the machine so that rotation of the screw moves the yoke.

Figure 4:
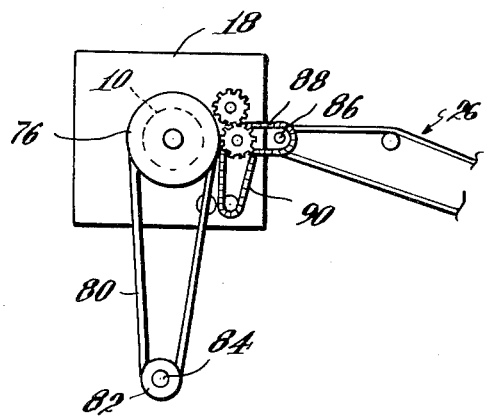
FIG. 4 is an elevation of the drive for one of the buffing wheels.
Figure 5:
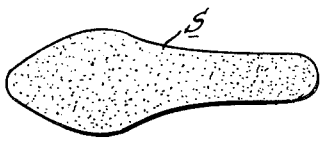
FIG. 5 is a plan view of a bottom element which has been buffed.

In FIG. 4 the buffing wheel 10 is shown as being driven by belts 80 entrained about the pulleys 76 fixed to the shaft 14 and pulleys 82 fixed to a shaft 84. The conveyor 26 is driven by a sprocket on a shaft 86. The feed rolls 38 and 42 are driven by meshing gears and chains 88 and 90 from the shaft 86. A similar drive is provided for the wheel 12, conveyor 24 and feed rolls 40 and 44. Conventional means are employed for driving the transfer means 54, 58, 64, 72 and 74 in such timed relation as to provide for continuity of operation.

While the apparatus herein shown is especially adapted for buffing outsoles comprised of plastic material, it is to be understood that it can be used equally well for buffing of rubber, composition or natural leather soles.

It should be understood that the present disclosure is for the purpose of illustration only and that this invention includes all modifications and equivalents which fall within the scope of the appended claims.

I claim:

1. Apparatus for buffing one surface of the bottom element of a shoe comprising first and second buffing wheels rotating in the same direction and first and second conveyors arranged to move elements disposed thereon toward the wheels into engagement with the downgoing sides thereof to buff the upper surfaces, of means for guiding an element downwardly relative to the downgoing side of the first wheel with the upper surface in contact therewith, guiding means for receiving the element buffed side down and transferring it to a place of inversion, of an inverter at said place of inversion for turning the element buffed side up, transfer means for receiving the element buffed side up from the inverter means and moving it into alignment with the second conveyor, and means for receiving the element buffed side up but with the opposite end leading from the transfer means and guiding it onto the second conveyor for engagement with the second buffing wheel.

2. Apparatus according to claim 1, wherein there is means for adjusting the buffing wheel relative to the feed rolls to compensate for wear.

3. Apparatus according to claim 1, wherein there are enclosures for the buffing wheels and means for exhausting the enclosures to remove loose material as fast as it is formed.

4. Apparatus for buffing one surface of the bottom element of a shoe comprising first and second buffing wheels rotating in the same direction and first and second conveyors arranged at the downgoing sides of the wheel for moving the leading ends of elements placed thereon into engagement with the downgoing sides of the wheels, of a first transfer device below the first wheel, of means for guiding an element downwardly relative to the first wheel to buff the surface in contact with the wheel and deposit it buffed side down on said first transfer means, of an inverter arranged to receive the element buffed side down from the first transfer means and turn the buffed side up, of a second transfer means for moving the elements buffed side up but with its opposite end leading into alignment with the second conveyor, and of a third transfer means operable to receive the element from the second transfer means and guide it onto the second conveyor.

5. Apparatus according to claim 4, wherein the inverter comprises an inclined plate situated above the surface of the second transfer means, said plate being inclined downwardly toward said surface in a direction opposite the direction of movement thereof and adjacent an end of the first transfer means and being operable, by engagement with an edge of an element projected from the first transfer means, to tilt the element downwardly into engagement with the moving surface of the second transfer means to turn the element over.

6. Apparatus according to claim 4, wherein the inverter comprises a downwardly inclined plate situated above the second transfer means adjacent the end of the first transfer means, said plate being inclined in a direction opposite to the direction of movement of the second transfer means, and means adjacent the upper part of the inclined plate operable to discharge a jet of air beneath an element projected from the first transfer means above the surface of the second transfer means.

7. Apparatus according to claim 4, wherein the inverter comprises a flat plate disposed adjacent the end of the first transfer means above the surface of the second transfer means and inclined downwardly toward the surface of the second transfer means in a direction opposite the direction of movement of the surface of the second transfer means to intercept and support an edge of an element projected from the first transfer means, and a second flat plate spaced from the first plate and inclined toward the first plate, said second flat plate operating to guide an element flipped over by the first plate downwardly onto the moving surface of the second transfer means.

8. Apparatus according to claim 4, wherein the inverter comprises spaced, downwardly inclined converging plates situated adjacent the end of the first transfer means above the second transfer means, and means associated with one of the plates operable to eject a jet of air below an element projected between the plates from the first transfer means.

9. Apparatus according to claim 4, wherein the third transfer means is situated below the second transfer means and there are downwardly inclined, spaced plates situated between the second and third transfer means for guiding an element downwardly from the second transfer means to the third transfer means without turning it over.

10. Apparatus according to claim 4, wherein the third transfer means is situated below the end of the second transfer means and there are downwardly converging plates spaced apart by an amount less than the width of an element situated between the second and third transfer means for guiding an element downwardly from the second transfer means to the third transfer means while maintaining its up-side uppermost.

11. Apparatus according to claim 4, wherein the third transfer means is situated below the second transfer means, there are downwardly inclined, spaced plates situated between the second and third transfer means for guiding an element downwardly from the second transfer means to the third transfer means, and there is means adjacent the plate which is the more remote from said second transfer means for ejecting a jet of air against the upper side of an element as it slides downwardly along the inclined surface of the plate which is next to the second transfer means.

12. Apparatus for buffing one surface of a bottom elemens of a shoe comprising first and second buffing wheels rotating in the same direction and first and second conveyors arranged at the downgoing sides of the wheels for moving elements placed thereon toward the downgoing sides of the wheels, of driven feed rolls adjacent the first buffing wheel for receiving an end of an element on the conveyor and moving it into engagement with the wheel, of first transfer means below the first wheel for receiving the buffed element, of a guide situated between the first wheel and the first transfer means sloping toward the first transfer means, of an inverter arranged to receive the element buffed side down from the first transfer means and turn it buffed side up, of a second transfer means for receiving the element buffed side up with its opposite end leading and moving it into alignment with the second conveyor, and of a third transfer means operable to receive the element from the second transfer means and guide it onto the second conveyor.

13. Apparatus according to claim 12, wherein the means for guiding the element from the first wheel to the first transfer means comprises a second pair of rolls situated below the feed rolls a distance not greater than the length of the element, a flat plate situated below the second pair of rolls inclined toward the first transfer means in the direction of movement of the first transfer means, and a third pair of rolls situated between the lower end of the plate and the surface of the first transfer means.

No references cited.